United States Patent
Smith (10) Patent No.: US 8,346,022 B2
(45) Date of Patent: Jan. 1, 2013

(54) SYSTEM AND METHOD FOR GENERATING AN INTRINSIC IMAGE USING TONE MAPPING AND LOG CHROMATICITY

(75) Inventor: Casey Arthur Smith, Grand Junction, CO (US)

(73) Assignee: Tandent Vision Science, Inc., San Francisco, CA (US)

( * ) Notice: Subject to any disclaimer, the term of this patent is extended or adjusted under 35 U.S.C. 154(b) by 665 days.

(21) Appl. No.: 12/584,218

(22) Filed: Sep. 2, 2009

(65) Prior Publication Data

US 2011/0052047 A1 Mar. 3, 2011

(51) Int. Cl.
*G06K 9/54* (2006.01)

(52) U.S. Cl. .............. 382/302; 382/162; 382/260

(58) Field of Classification Search .......... 345/426, 345/589, 600, 617; 348/308, 663, 673; 375/240.16, 375/240.25; 382/164, 167, 199, 224
See application file for complete search history.

(56) References Cited

U.S. PATENT DOCUMENTS

| | | | |
|---|---|---|---|
| 6,046,723 A * | 4/2000 | Daniels et al. | 345/600 |
| 7,433,514 B2 * | 10/2008 | Sloan | 382/167 |
| 7,995,058 B2 * | 8/2011 | Smith et al. | 345/426 |
| 8,106,982 B2 * | 1/2012 | Collins | 348/308 |
| 2004/0096103 A1 | 5/2004 | Gallagher et al. | 382/167 |
| 2007/0176940 A1 | 8/2007 | Maxwell et al. | 345/589 |
| 2007/0242878 A1 | 10/2007 | Maxwell et al. | 382/168 |
| 2008/0031526 A1 * | 2/2008 | Bushell et al. | 382/224 |
| 2008/0118105 A1 | 5/2008 | Friedhoff et al. | 382/103 |
| 2009/0027558 A1 * | 1/2009 | Mantiuk et al. | 348/673 |
| 2009/0034835 A1 | 2/2009 | Maxwell et al. | 382/164 |
| 2009/0046207 A1 * | 2/2009 | Salvucci | 348/663 |
| 2009/0110323 A1 | 4/2009 | Fischer et al. | 382/274 |
| 2009/0161950 A1 | 6/2009 | Dana et al. | 382/165 |
| 2009/0245651 A1 * | 10/2009 | Friedhoff et al. | 382/199 |
| 2010/0183071 A1 * | 7/2010 | Segall et al. | 375/240.16 |
| 2010/0238190 A1 * | 9/2010 | Ciurea et al. | 345/589 |
| 2010/0329546 A1 * | 12/2010 | Smith | 382/164 |
| 2011/0235720 A1 * | 9/2011 | Banterle et al. | 375/240.25 |
| 2011/0310116 A1 * | 12/2011 | Muijs | 345/617 |

OTHER PUBLICATIONS

Frédo Durand and Julie Dorsey: "Fast Bilateral Filtering for the Display of High-Dynamic-Range Images," ACM Transactions of Graphics (Proceedings of the ACM SIGGRAPH '02 Conference).

Sylvain Paris and Frédo Durand: "A Fast Approximation of the Bilateral Filter using a Signal Processing Approach," European Conference on Computer Vision (ECCV '06).

* cited by examiner

*Primary Examiner* — Vu Le
*Assistant Examiner* — Xuemei Chen
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image in an array of pixels, in a computer memory, performing a tone mapping method on the image, performing a log chromaticity method on the image and calculating a color value for each pixel as a function of information relevant to the tone mapping method and the log chromaticity method.

23 Claims, 5 Drawing Sheets

FIG. 1

Pixel Array for Storing Image Data

| P(1, 1) | P(1, 2) | ••• | | ••• | P(1, M) |
|---|---|---|---|---|---|
| P(2, 1) | P(2, 2) | | | | • |
| P(3, 1) | P(3, 2) | | | | • |
| ⋮ | | | | | |
| • | | | | | • |
| P(N, 1) | ••• | | | ••• | P(N, M) |

Image File
�ణ 18

SYSTEM AND METHOD FOR GENERATING AN INTRINSIC IMAGE USING TONE MAPPING AND LOG CHROMATICITY

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object within an image has been a persistent challenge to scientists. Such an ability can be particularly critical, for example, in computer vision applications, as may be implemented in a robot or a security camera used to identify objects moving through a selected field of view. A computer must be able to identify structures and features of a scene that can be modified in appearance due to overlying shadows. Cognitive processing of the human brain makes it possible for humans to automatically distinguish shadow from object. However, to a computer, it is all pixel values of varying color characteristics. Accordingly, there is a persistent need for the development of accurate and correct techniques that can be utilized in the operations of computers relating to images, to provide improved image appearance optimized for further processing.

SUMMARY OF THE INVENTION

The present invention provides a method and system implementing image processing techniques that utilize spatio-spectral information relevant to an image, to perform an operation to accurately and correctly identify and separate illumination and material aspects of the image.

In a first exemplary embodiment of the present invention, an automated, computerized method is provided for processing an image. According to a feature of the present invention, the method comprises the steps of providing an image file depicting an image in an array of pixels, in a computer memory, performing a tone mapping method on the image, performing a log chromaticity method on the image and calculating a color value for each pixel as a function of information relevant to the tone mapping method and the log chromaticity method.

In a second exemplary embodiment of the present invention, a computer system is provided. The computer system comprises a CPU and a memory storing an image file containing an image in an array of pixels. According to a feature of the present invention, the CPU is arranged and configured to execute a routine to perform a tone mapping method on the image, perform a log chromaticity method on the image, and calculate a color value for each pixel as a function of information relevant to the tone mapping method and the log chromaticity method.

In a third exemplary embodiment of the present invention, a computer program product is provided. According to a feature of the present invention, the computer program product is disposed on a computer readable media, and the product includes computer executable process steps operable to control a computer to: provide an image in an array of pixels, perform a tone mapping method on the image, perform a log chromaticity method on the image, and calculate a color value for each pixel as a function of information relevant to the tone mapping method and the log chromaticity method.

In a fourth exemplary embodiment of the present invention, an automated, computerized method is provided for processing an image. According to a feature of the present invention, the method comprises the steps of receiving an intrinsic material image of the image, identifying regions in the image defining a color boundary, identifying a region between the color boundary regions, the between region defining a color transition, determining color transition information for the between region and re-coloring a corresponding between region of the material image, as a function of the color transition information.

In a fifth exemplary embodiment of the present invention, a computer program product is provided. According to a feature of the present invention, the computer program product is disposed on a computer readable media, and the product includes computer executable process steps operable to control a computer to: receive an intrinsic material image of an image, identify regions in the image defining a color boundary, identify a region between the color boundary regions, the between region defining a color transition, determine color transition information for the between region and re-color a corresponding between region of the material image, as a function of the color transition information.

In accordance with yet further embodiments of the present invention, computer systems are provided, which include one or more computers configured (e.g., programmed) to perform the methods described above. In accordance with other embodiments of the present invention, a computer program products, including computer readable media, are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

DETAILED DESCRIPTION OF THE PREFERRED EMBODIMENTS

Figure 1:
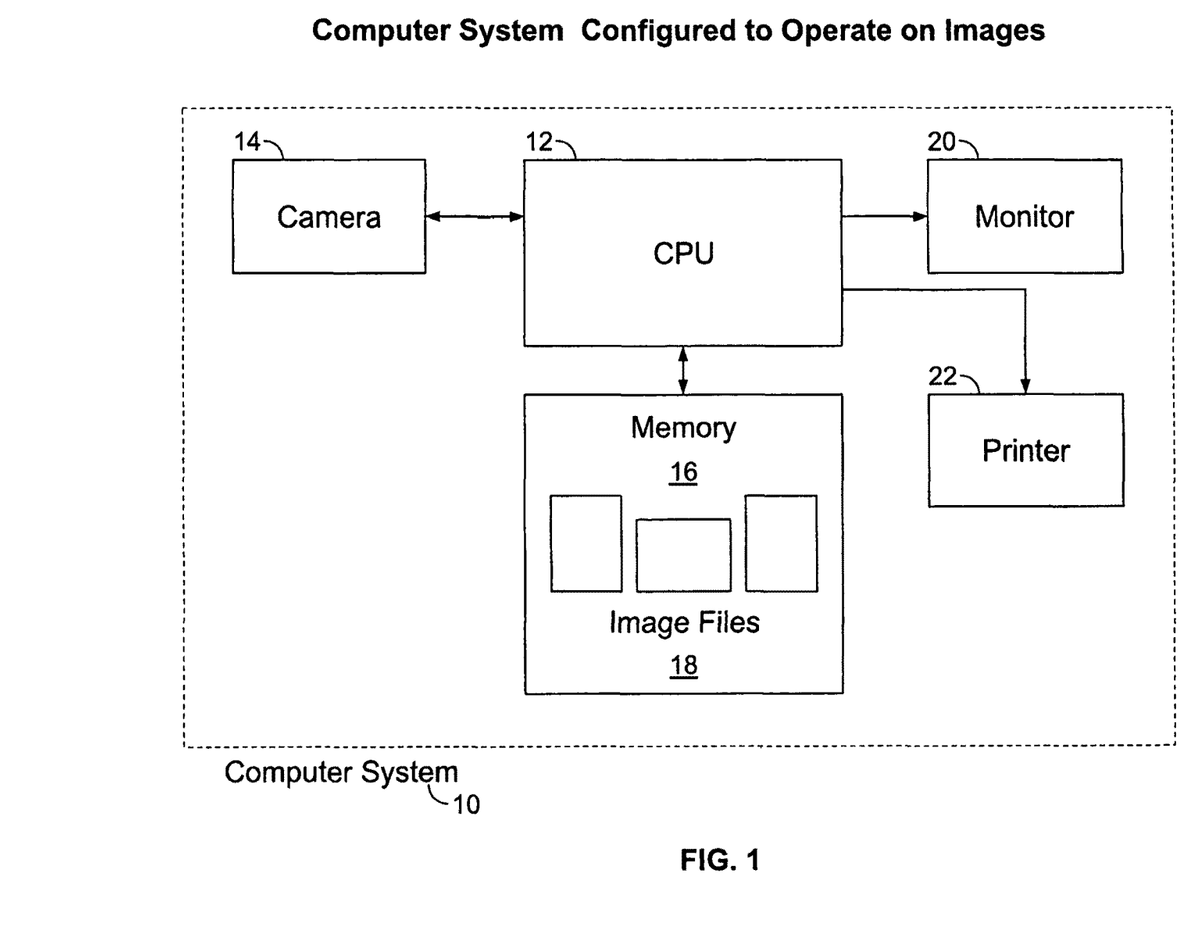
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

Figure 2:
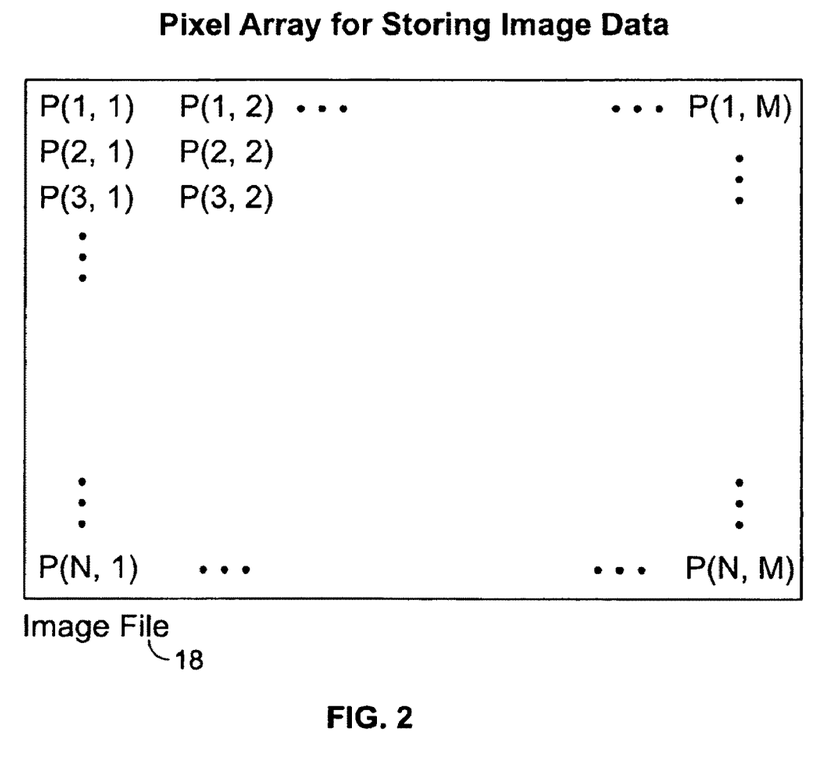
FIG. 2 shows an n×m pixel array image file for an image stored in the computer system of FIG. 1.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system for generation of intrinsic images using tone mapping and log chromaticity. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

A fundamental observation underlying a basic discovery of the present invention, is that an image comprises two components, material and illumination. All changes in an image are caused by one or the other of these components. Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination flux effecting the image. When one of material and illumination is known in an image, the other can be readily deduced.

Figure 3:
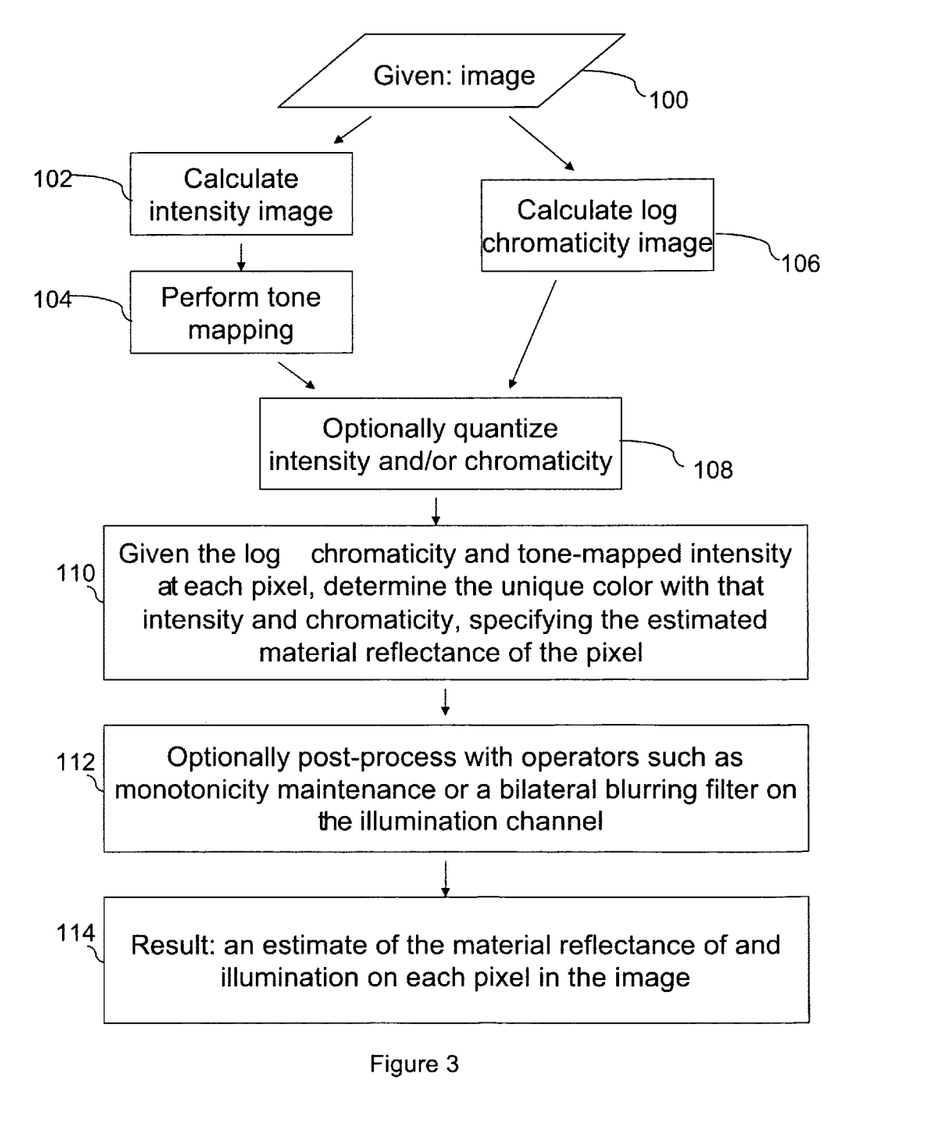
FIG. 3 is a flow chart for estimating material reflectance and illumination aspects of an image depicted in the image file of FIG. 2, according to a feature of the present invention.

Referring now to FIG. 3, there is shown a flow chart for estimating material reflectance and illumination aspects of an image depicted in an image file 18, according to a feature of the present invention. In step 100, an input image file 18 is given to the CPU 12. Upon input of an image file 18, the CPU 12 executes, independently, either serially, or in parallel, operations for performing each of a tone mapping (steps 102 and 104) and a calculation of log chromaticity values (step 106) for the image depicted in the input image file 18, as will appear.

Tone mapping is a technique for preserving local variation within an image, while reducing global variation. Specific known methods for performing tone mapping on an image are described in "Fast Bilateral Filtering for the Display of High-Dynamic-Range Images," Frédo Durand and Julie Dorsey, ACM Transactions of Graphics (Proceedings of the ACM SIGGRAPH '02 Conference), and "A Fast Approximation of the Bilateral Filter using a Signal Processing Approach," Sylvain Paris and Frédo Durand, European Conference on Computer Vision (ECCV '06).

Performance of the technique separates an image into a "level" channel and a "detail" channel. The level channel depicts large scale variations of the image, without details, which are depicted in the detail channel. As such, the level channel is a reasonable approximation of log illumination intensity of the image, and the detail channel is a reasonable approximation of the log material intensity. The output of a standard tone mapping technique is an intensity specification for each pixel of the image, such as, for example, a pixel p(n,m, R, G, B) is specified by the value (R+G+B)/3.

According to a feature of the present invention, a standard tone mapping technique is modified in a manner to accommodate the objective of segregating illumination and material aspects of an image from one another. In a standard tone mapping operation, the dynamic range of the level channel is reduced and then recombined with the detailed channel to provide a reduction in global contrast while preserving local contrast. In an exemplary implementation of the present invention, the tone mapping is used in a manner that attempts to remove global variation rather than just reduce global variation, to segregate out an illumination invariant material aspect of the image.

A formula for implementing a reconstruction of an intensity image with a reduction of the dynamic range of the level channel, can be expressed in terms of a simple linear transform. For example, let max=the maximum value in the level channel, min=the minimum value in the level channel, and δ represent a desired contrast (max−min). Then a dynamic range reduction can be performed by multiplying each value in the level channel by $\log(\delta)/(\max-\min)$. A typical value for δ, in a standard application of tone mapping, is 40, which corresponds to the dynamic range of print media, wherein black ink is 40 times darker than white paper.

Thus, a standard reconstruction for an intensity image I, can be expressed by:

$$I=\exp(l*\log(40)/(\max-\min)+1*d)$$

wherein l is the level channel and d is the detail channel

According to a feature of the present invention, the desired contrast (in an attempt to eliminate the effects of illumination) is set at 1 or lower, for example, 0.85. Thus, pursuant to an exemplary embodiment of the present invention, a reconstruction to provide a material intensity image (M) is expressed by:

$$M=\exp(l*\log(0.85)/(\max-\min)+1.2*d)$$

As indicated in the above formula for M, the local contrast of the detail channel d is also modified by multiplying the detail channel by 1.2. Thus, according to a feature of the present invention, a unique material intensity based value can be determined for each pixel of an image by modifying a tone mapping technique toward an attempt to eliminate the effects of illumination, as described above.

Log chromaticity is a technique for developing a two dimensional illumination invariant chromaticity space. A method and system for separating illumination and reflectance using a log chromaticity space is disclosed in U.S.

Patent Application Publication No. 2007/0242878, published on Oct. 18, 2007, which is hereby expressly incorporated by reference. Log chromaticity representation values provide illumination invariant values for pixels of the image. Logarithmic values of the color band values of the image pixels are plotted on a log-color space graph. The logarithmic values are then projected to a log-chromaticity projection plane oriented as a function of a bi-illuminant dichromatic reflection model (BIDR model). The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Thus, RGB values of a material color, from full light to full shadow, vary generally along a gentle one dimensional curve in RGB space. For more detailed information on the BIDR model, reference should be made to U.S. application Ser. No. 11/341,751, filed Jan. 27, 2006, entitled: "Bi-illuminant Dichromatic Reflection Model For Image Manipulation," published as US 2007/0176940 on Aug. 2, 2007.

A measured color C of a pixel, according to the BIDR model, can be expressed as: $C_\lambda = (A_\lambda + \gamma D_\lambda) M_\lambda$, where A is the ambient illumination, D is the direct or incident illumination, γ is a scalar from 0 to 1, representing the fraction of the direct illumination, D, falling upon the point in the image represented by the respective pixel, M is the material reflectance of the surface and λ is the wavelength or color band, such as red, green or blue.

In log space, the equation is stated as: $\log C_\lambda = \log(A_\lambda + \gamma D_\lambda) + \log M_\lambda$.

If a measurement is taken of color value a two locations on the same material ($C_{1,\lambda}$, $C_{2,\lambda}$), one in full light (for $C_{1,\lambda}$, γ=1), and the other in full shadow (for $C_{2,\lambda}$, γ=0), the difference in color values is stated by: $\log C_{1,\lambda} - \log C_{2,\lambda} = \log(A_\lambda + D_\lambda) - \log A_\lambda$.

It should be noted that the difference equation is independent of material reflectance. Accordingly, in a log RGB color space, the orientation of the positive slope is the same for the BIDR cylinders for all materials depicted in the image. Thus, projections of the BIDR cylinders onto a plane perpendicular to the common orientation can be utilized to provide an unique, illumination invariant value (based upon chromaticity) for each pixel of an image.

Figure 4:
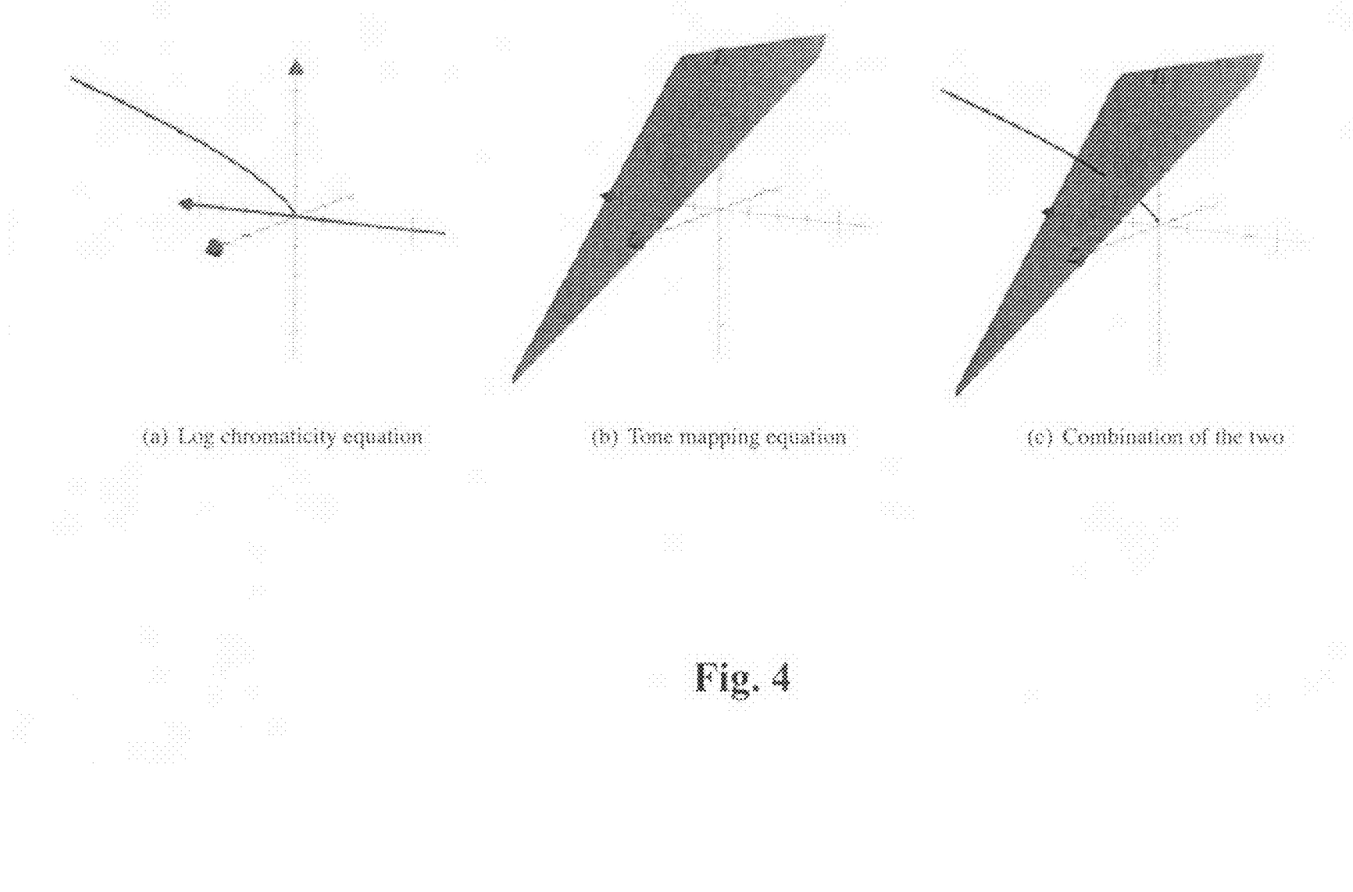
FIG. 4 depicts graphic illustrations of (a) a log chromaticity equation, (b) a tone mapping equation and (c) a combination of the previous two equations.

According to a feature of the present invention, a unique, illumination invariant material color for each pixel can be determined as a function of a combination of tone mapping and log chromaticity information relevant to the pixel. As shown in FIG. 4(a), a plot of the log chromaticity equation defines, for a particular material, a gently curving, one dimensional line in, for example, an RGB space, corresponding to the varying colors of the material, from full light, to full shadow. Tone mapping for a pixel specifies a particular intensity for the pixel, but not a specific color. As shown in FIG. 4(b), this property of tone mapping defines a two dimensional plane in RGB space. There is exactly one color value that satisfies both the log chromaticity and tone mapping intensity equations (see FIG. 4(c)).

Log chromaticity can be expressed by the following equation:

$$\log M_\lambda = \log C_\lambda + \gamma \log N_\lambda,$$

where M is the material color, C is the measured image color, as stored in an image file 18, N is the normal to the log chromaticity plane (corresponding to the common orientation of the BIDR cylinders in log RGB space), and γ is the unknown factor parameterizing the log chromaticity line in log RGB space.

In linear space, the log chromaticity equation becomes:

$$M_\lambda = \exp(\log C_\lambda + \gamma \log N_\lambda).$$

In RGB space, the equation defines the one dimensional curve depicted in FIG. 4(a), that specifies all the varying colors for the material represented by a respective pixel, from fully lit to full shadow.

As noted above, tone mapping specifies a particular intensity for each pixel. The intensity can be measured in many ways. For example:

$$I = (R+G+B)/3.$$

A formula such as the above stated intensity equation is a single-valued function that specifies a two dimensional manifold, such as the plane illustrated in FIG. 4(b). To the extent that illumination variation is large relative to material variation (i.e. shadows are sufficiently deep such that shadowed bright materials are significantly darker than lit dark materials) tone mapping provides a reasonable estimate of the intensity of material reflectance at each pixel in an image. Thus, the two dimensional manifold represents a range of colors that includes a full-lit version of the material represented by a pixel.

According to a feature of the present invention, the one color value in RGB space that is both on the log chromaticity line and in the tone mapping intensity plane, for a pixel (see FIG. 4(c)) is taken as the material color for that pixel. The one color value that satisfies both the log chromaticity and tone mapping equations can be determined by constraining a pixel color value for a pixel $P_0$, to the requirements of both equations.

In the simplest case, where I=(R+G+B)/3, the following equations specify an intensity for a color value for $P_0$ that satisfies both of the log chromaticity and tone mapping equations:

$$M_{red} = \exp(\log(C_{red}) + \gamma \log(N_{red}))$$

$$M_{green} = \exp(\log(C_{green}) + \gamma \log(N_{green}))$$

$$M_{blue} = \exp(\log(C_{blue}) + \gamma \log(N_{blue}))$$

where Intensity (M)=V (the actual value returned by execution of the tone mapping), the C values are the known measured values for the pixel $P_0$, as stored in an image file 18, N is the normal to the log chromaticity plane, as determined via execution of the methods taught in the above cited U.S. Patent Application Publication No. 2007/0242878, and γ is to be found, set at a value such that the following condition is met:

$$((\exp(\log(C_{red}) + \gamma \log(N_{red}))) + (\exp(\log(C_{green}) + \gamma \log(N_{green}))) + (\exp(\log(C_{blue}) + \gamma \log(N_{blue}))))/3 - V = 0$$

An approximate solution for a value of γ that satisfies the above condition can be determined using a standard root-finding method, such as Newton's method. When an approximate solution for γ has been determined, the determined value is plugged into the above equations to solve for $M_{red}$, $M_{green}$, and $M_{blue}$ to thereby provide a material reflectance value for the pixel $P_0$.

Referring once again to FIG. 3, in step 102, the CPU 12 operates to calculate an intensity value for each pixel of the input image file 18. In step 104, the CPU executes a standard tone mapping operation, modified as described above, toward an attempt to eliminate the effects of illumination. Thus, through execution of steps 102 and 104, the CPU 12 determines a V value for each pixel of the input image file 18.

In a separate operation, performed serially or in parallel to steps 102 and 104, the CPU 12 executes step 106, to calculate a log chromaticity image. In this manner, the CPU 12 can determine a value for N, for the input image file 18. The CPU 12 can also determine a log chromaticity value for each pixel of the input image file 18, that corresponds to a location on a log chromaticity plane, as taught in U.S. Patent Application Publication No. 2007/0242878.

Optionally, in step 108, the CPU 12 operates to quantize the tone mapping intensity and/or log chromaticity values for improved operating results. Initially, the CPU 12 clusters the log chromaticity values of the pixels, as determined by the CPU 12 in step 106. This can be performed by any known, standard clustering method, such as lead-follower clustering. Then within each chromaticity cluster, the CPU 12 clusters the tone mapping intensity values. For each pixel within a chromaticity cluster, the CPU 12 checks to determine which tone mapping intensity cluster the pixel is in, and then sets the intensity value for the pixel to the mean intensity value for the respective cluster. Quantizing the intensity in this manner reduces the influence of slow intensity change in an image, often due to shading, which can remain in the tone-mapped output.

Log chromaticity values can be subject to a quantizing by setting the log chromaticity value for each pixel to the mean of a respective cluster.

In step 110, for each pixel in the input image file 18, the CPU 12 utilizes the determined values of V and N to solve for $\gamma$, and then, with the solved value for $\gamma$, solves the $M_{red}$, $M_{green}$, and $M_{blue}$ equations with the determined values of $\gamma$, V and N, to provide an estimated material reflectance value for each pixel. This provides an intrinsic material image corresponding to the image depicted in the input image file 18. For an illumination image, the CPU 12 can execute the formula I=ML, where I is the image color, as recorded and stored in the respective image file 18, M the material component of the recorded image color, as solved for with the $M_{red}$, $M_{green}$, and $M_{blue}$ equations and L the illumination component of the recorded image color, to be solved for in the equation.

In step 112, the CPU 12 optionally performs post-processing, such as, for example, monotonicity maintenance and the use of a bilateral blurring filter on the illumination image. Tone mapping can be prone to certain types of errors, particularly "halo effects." Halo effects occur next to edges of high contrast. Close to the edge, the bright region becomes even brighter, and the dark region becomes even darker. Monotonicity maintenance can aid in the removal of the halo effects.

A monotonic linear transition in an image relates to blend pixels. Blend pixels are pixels between two differently colored regions of an image. If the colors between the two regions are plotted in RGB space, there is a linear transition between the colors, with each blend pixel, moving from one region to the next, being a weighted average of the colors of the two regions.

As one moves in color space, from a first region to a second region, the weighted average of the colors of the blend pixels transition linearly, from a weighted average weighted in favor of the color of the first region to a weighted average weighted in favor of the color of the second region. The two regions can be regions of differently colored materials, or a region of a single material with a transition from lit to shadowed regions of the single material. In the performance of the method of the present invention, monotonic linear transitions can be distorted in the generated intrinsic images, such as the halo effect.

Figure 5:
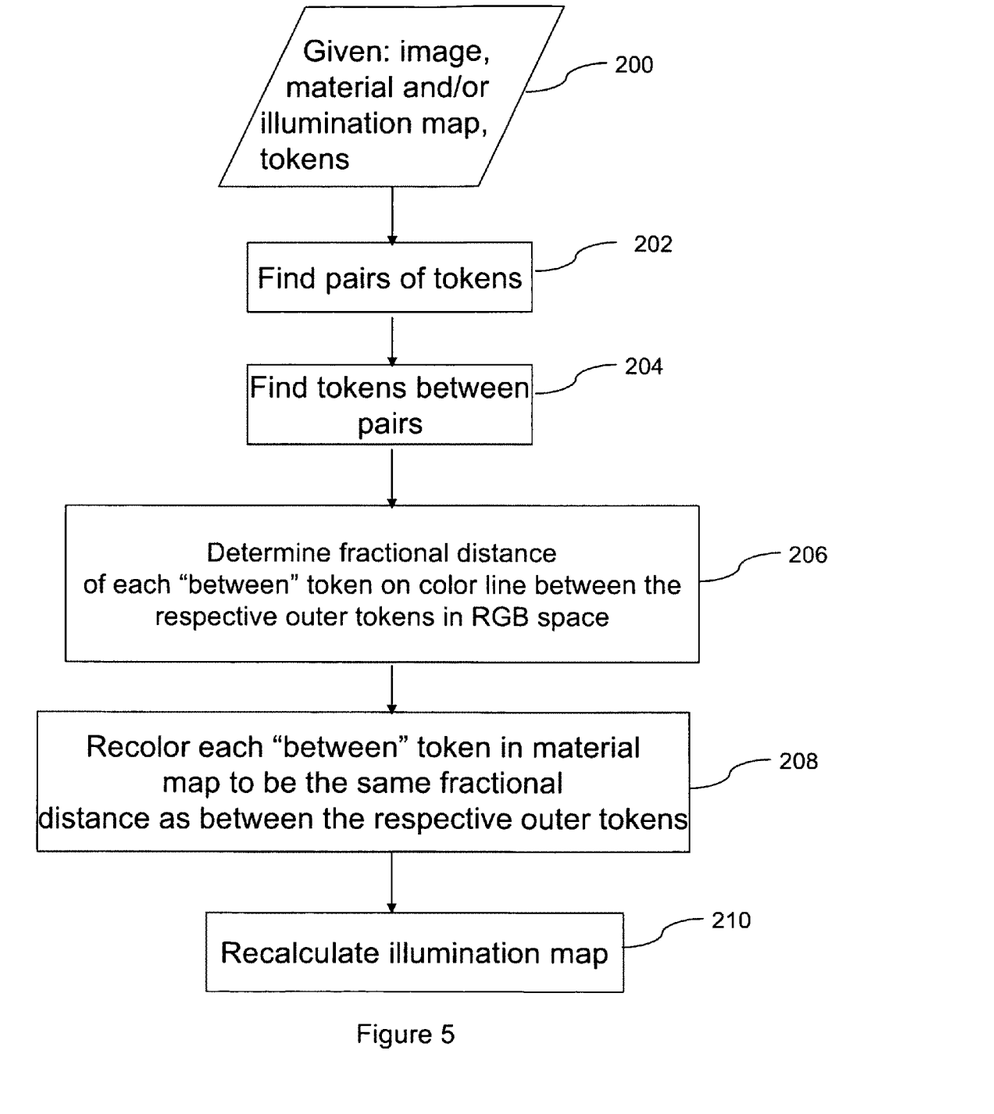
FIG. 5 is a flow chart for performing monotonicity maintenance in an image.

Referring now to FIG. 5, there is shown a flow chart for performing monotonicity maintenance in an image. In step 200, the CPU 12 is provide with the original input image file 18, and intrinsic material and illumination images corresponding to the image file 18, for example, as generated through performance of the routine of FIG. 3. The CPU 12 identifies tokens in the input image file 18.

A token can comprise, for example, a uniform, homogeneous Type C token, which comprises an image region having a single robust color measurement among contiguous pixels of the region. A seed test can be utilized by the CPU 12 to identify Type C tokens in an image file 18. The CPU 12 selects a first pixel, i=(1, 1) for example, the pixel at the upper left corner of a first N×N sample of the image file 18. The pixel is then tested to determine if the selected pixel is part of a good seed. The test can comprise a comparison of the color value of the selected pixel to the color values of a preselected number of its neighboring pixels as the seed, for example, the N×N array. The color value comparison can be with respect to multiple color band values (RGB in our example) of the pixel.

When a good seed is found, the CPU 12 proceeds to examine pixels contiguous to the seed, to build out a token. For a more detailed description of token identification, reference is made to U.S. Patent Application Publication No. 2009/0034835, published on Feb. 5, 2009.

In step 202, the CPU 12 identifies pairs of tokens, each pair exhibiting certain properties, for example:
1. The two tokens of the pair are within a preselected distance d, (for example, d=15 pixels), of each other within the image space.
2. The two tokens have a minimum seed size $s_1$, (for example, $s_1$=2).
3. The two tokens have at least $p_1$ pixels each, (for example, $p_1$=20).
4. The two tokens have a color relationship such that one is brighter than the other in all color bands.
5. The two tokens have a color relationship such that the two colors are sufficiently different from one another.

In step 204, the CPU 12 identifies, for each token pair, all tokens that are both spatially between the tokens of the pair, and satisfy the following criteria:
1. The "between" token has a color close to the line in RGB space that extends between the colors of the tokens of the respective pair (to satisfy a monotonic linear transition condition).
2. The "between" token has a seed size of at most $s_2$, (for example, $s_2$=2).
3. The "between" token has at most $p_2$ pixels, (for example, $p_2$=20).

In step 206, the CPU 12 records, for each identified "between" token, the pair of tokens it is located between and the position of its color along the color line in RGB space between the colors of the respective token pair.

In step 208, the CPU 12 modifies the material image based upon the information recorded for "between" tokens. According to a feature of the present invention, the CPU 12 identifies tokens in the material image that correspond, pixel by pixel, to the tokens of the input image file 18. The CPU 12 then proceeds to recolor each corresponding "between" token of the material image, to be the color at the same fractional distance along the color line in RGB space between the colors of the respective corresponding token pair.

In step 210, the CPU 12 recalculates the illumination image, as a function of the re-colored material image, by execution of the I=ML equation.

Moreover, detail of the image may appear in the illumination image. Execution of the I=ML equation can result in image detail being forced into the illumination image. To force the detail back into the material image, the illumination image is blurred by passing the image through a bilateral blurring filter, and then the material image is recalculated.

Referring once again to FIG. 3, in step 114, the CPU 12 outputs a material reflectance image and an illumination image.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
    providing an image file depicting an image in an array of pixels, in a computer memory;
    performing a tone mapping method on the image;
    performing a log chromaticity method on the image; and
    calculating a color value for each pixel as a function of information relevant to the tone mapping method and the log chromaticity method, such that the function constrains the color value for each pixel to the requirements of each of the tone mapping method and the log chromaticity method.

2. The method of claim 1 wherein the tone mapping method is modified to eliminate the effects of illumination.

3. The method of claim 1 wherein the information relevant to the tone mapping method and the log chromaticity method includes a value for a normal N to a log chromaticity plane.

4. The method of claim 1 wherein the information relevant to the tone mapping method and the log chromaticity method includes a value for each pixel specifying a tone mapping intensity V.

5. The method of claim 1 comprising the further step of quantizing the information relevant to the tone mapping method and the log chromaticity method.

6. The method of claim 1 comprising the further step of utilizing the color value for each pixel to generate a material intrinsic image.

7. The method of claim 6 comprising the further step of utilizing the material intrinsic image to generate an illumination intrinsic image.

8. The method of claim 6 comprising the further step of performing monotonicity maintenance on the material intrinsic image.

9. The method of claim 7 comprising the further step of passing the illumination intrinsic image through a bilateral blurring filter, and regenerating the material intrinsic image as a function of the blurred illumination intrinsic image.

10. A computer system which comprises:
    a CPU; and
    a memory storing an image file containing an image in an array of pixels;
    the CPU arranged and configured to execute a routine to perform a tone mapping method on the image, perform a log chromaticity method on the image, and calculate a color value for each pixel as a function of information relevant to the tone mapping method and the log chromaticity method, such that the function constrains the color value for each pixel to the requirements of each of the tone mapping method and the log chromaticity method.

11. A non-transitory computer readable medium storing a program including computer executable process steps operable to control a computer to: provide an image in an array of pixels, perform a tone mapping method on the image, perform a log chromaticity method on the image, and calculate a color value for each pixel as a function of information relevant to the tone mapping method and the log chromaticity method, such that the function constrains the color value for each pixel to the requirements of each of the tone mapping method and the log chromaticity method.

12. The computer program product of claim 11 wherein the tone mapping method is modified to eliminate the effects of illumination.

13. The computer program product of claim 11 wherein the information relevant to the tone mapping method and the log chromaticity method includes a value for a normal N to a log chromaticity plane.

14. The computer program product of claim 11 wherein the information relevant to the tone mapping method and the log chromaticity method includes a value for each pixel specifying a tone mapping intensity V.

15. The computer program product of claim 11 wherein the product includes the further process step to control a computer to quantize the information relevant to the tone mapping method and the log chromaticity method.

16. The computer program product of claim 11 wherein the product includes the further process step to control a computer to utilize the color value for each pixel to generate a material intrinsic image.

17. The computer program product of claim 16 wherein the product includes the further process step to control a computer to utilize the material intrinsic image to generate an illumination intrinsic image.

18. The computer program product of claim 11 wherein the product includes the further process step to control a computer to perform monotonicity maintenance on the material intrinsic image.

19. The computer program product of claim 17 wherein the product includes the further process steps to control a computer to pass the illumination intrinsic image through a bilateral blurring filter, and regenerate the material intrinsic image as a function of the blurred illumination intrinsic image.

20. An automated, computerized method for processing an image, comprising the steps of:
    receiving an intrinsic material image of the image;
    identifying regions in the image defining a color boundary;
    identifying in the image a region between the color boundary regions, the between region defining a color transition;
    determining color transition information for the between region, the color transition information comprising a fractional distance along a color line, in a color space, the color line extending between the colors of the regions defining a color boundary; and
    re-coloring a corresponding between region of the material image, as a function of the color transition information, to be a color at the same fractional distance along the color line as for the image to correct distorted monotonic linear transitions in the intrinsic material image.

21. The method of claim 20, comprising the further step of recalculating an illumination image as a function of the re-colored material image.

22. A non-transitory computer readable medium storing a program including computer executable process steps operable to control a computer to: receive an intrinsic material image of an image, identify regions in the image defining a color boundary, identify in the image a region between the color boundary regions, the between region defining a color transition, determine color transition information for the between region, the color transition information comprising a fractional distance along a color line, in a color space, the color line extending between the colors of the regions defining a color boundary and re-color a corresponding between region of the material image, as a function of the color transition information, to be a color at the same fractional distance along the color line as for the image to correct distorted monotonic linear transitions in the intrinsic material image.

23. The computer program product of claim 22 wherein the product includes the further process step to control a computer to recalculate an illumination image as a function of the re-colored material image.

* * * * *